United States Patent [19]

Sekine et al.

[11] Patent Number: 4,726,758

[45] Date of Patent: Feb. 23, 1988

[54] MOLD

[75] Inventors: Masaoki Sekine, Saku; Toshihiko Ishida, Komoro, both of Japan

[73] Assignee: TDK Corporation, Tokyo, Japan

[21] Appl. No.: 917,770

[22] Filed: Oct. 10, 1986

[30] Foreign Application Priority Data

Nov. 15, 1985 [JP] Japan ................................ 60-254680

[51] Int. Cl.⁴ .............................................. B29C 45/04
[52] U.S. Cl. ..................................... 425/575; 264/245; 264/328.8; 425/577
[58] Field of Search ............... 425/556, 574, 575, 577, 425/810; 249/105; 264/328.7, 328.8, 328.11, 245–247, 250, 254, 255; 428/13, 120, 138, 913.3

[56] References Cited

U.S. PATENT DOCUMENTS

| | | | |
|---|---|---|---|
| 2,612,666 | 10/1952 | McGarigal | 425/575 X |
| 3,466,700 | 9/1969 | Harrison | 425/575 X |
| 3,702,750 | 11/1972 | Veneria | 425/575 X |
| 3,804,576 | 4/1974 | Hehl | 425/575 X |
| 3,832,110 | 8/1974 | Hehl | 425/575 X |
| 4,383,819 | 5/1983 | Letica | 425/556 X |
| 4,440,820 | 4/1984 | Shiho et al. | 428/120 |
| 4,531,703 | 7/1985 | Underwood | 425/556 X |
| 4,610,621 | 9/1986 | Taber et al. | 425/577 |
| 4,620,958 | 11/1986 | Wiechard | 425/556 X |
| 4,676,941 | 6/1987 | Shiho et al. | 264/247 |

Primary Examiner—Richard L. Chiesa
Attorney, Agent, or Firm—Seidel, Gonda, Goldhammer & Abbott

[57] ABSTRACT

A mold for stepwise molding by two or more injection shots of different materials or colors comprises fixed and movable mold halves and a slide core which combinedly form a first cavity and, with the slide core moved down, a second cavity for the shots to form a molded article of unitary structure, such as a housing section of an audio cassette tape with a see-through window. Ribs are formed on the slide core along its peripheries, and a land projection is formed on the inner side of the fixed mold half to be in contact with the molding surface of the slide core recessed with respect to the ribs. The inner peripheral wall faces of the ribs and the peripheral wall faces of the land projection of the fixed mold half are spaced apart to remain out of contact during mold clamping.

2 Claims, 5 Drawing Figures

PRIOR ART

MOLD

BACKGROUND OF THE INVENTION

This invention relates to improvements in a mold, especially for making the housing or an audio cassette tape or the like.

The invention is aimed at providing such a mold of long service life capable of producing a cassette housing which does not hamper smooth tape running and has a see-through window protected from damage. The mold is for use in a process for simultaneously molding materials of varied kinds or colors, or a process of injection molding whereby a unitary molded article of two or more different colors or kinds is obtained by a combination of a mold a part of which is shiftable in position to provide an additional mold cavity or cavities for secondary or further injection shots contiguous to the cavity for the first shot, and separate injection units for primary and secondary or further shots (the process being hereinafter called "stepwise molding process").

Before proceeding to the description of the present invention, an example illustrative of the conventional stepwise molding process incorporating the so-called hot-runner molding technique will be explained. The process is applied here to the manufacture of an upper housing section (of a colored resin) with a see-through window (of a transparent resin) of an audio cassette. Referring to FIG. 1 of the accompanying drawing, there is shown the cassette tape as assembled, with the housing sections 1 and 3 made of a colored resin and the window 2 made of a transparent resin.

FIGS. 2 and 3 illustrate different stages of stepwise molding process using the hot-runner molding technique for forming the upper housing section 1 and the see-through window 2 shown in cross section through the line A-A' in FIG. 1. FIG. 2 is the sectional view of the mold arrangement at the time of primary injection, or when the upper housing section 1 is made. In the figure, 4 is a fixed mold half, 5 a movable mold half, 6 a slide core, 7 a primary injection gate, and secondary injection at a secondary injection gate 8. The colored resin in molten state to form the upper housing section 1 is forced through the gate 7 to fill up the mold cavity and become solid. FIG. 3 is the sectional view of the mold arrangement at the time of secondary injection, or when the see-through window 2 is formed. On completion of the upper housing section 1 the slide core moves a distance equal to the thickness t of the see-through window 2 in the direction of the arrow. The second cavity thus formed is filled up with the transparent resin in molten state shot through the gate 8. The heat of the newly introduced transparent resin is partly conducted to the colored resin already solidified by the injection pressure, half melting the resin portions in contact with the new shot. When these portions have cooled down and solidified again, the resulting upper housing section 1 and see-through window are integrally united.

For added strength of the bond between the colored resin and the see-through window, the latter needs extra bonded portions in parallel with the horizontal planes of the upper housing section. Thus, the see-through window must have shoulders or steps as indicated in FIGS. 2 and 3. Structurally, this results in the formation of a recess 9 on the inner side of the see-through window, with a depth equal to the height of the steps d. This recess can sometimes cause troubles in the case of an audio cassette or the like which has specified internal dimensions and uses sheets interposed between the tape wound therein and the upper and lower housing sections. The existence of the above recess makes if difficult for such a sheet to press the tape and regulate its winding or unwinding motion, while allowing the sheet to slacken out of shape within the recess, leading to unsmooth running of the tape.

Therefore, it is an object of the present invention to provide a mold capable of avoiding the formation of a recess on the inner side of a secondarily formed section during the secondary injection of a stepwise molding process.

Another object of the invention is to provide a mold of the character defined above which exhibits long service life without being damaged on its molding surfaces.

SUMMARY OF THE INVENTION

The present invention comprises a mold for use in carrying out the stepwise molding process, wherein a slide core has ribs formed on the peripheral portions of the upper surface thereof to the same height as that of steps required for joining the parts formed by primary and secondary injection shots, said ribs being adapted to be in contact with the fixed mold half, which in turn has a land projection in contact with the bottom of the recessed slide core surface defined by the ribs, so that the mold halves do not form a recess on the inner side of the resulting see-through window.

In a preferred embodiment of the invention, a space is provided between each of the ribs on the peripheral portions on the upper surface of the slide core and each of the peripheral walls of the land projection on the fixed mold half. The spaces so formed are large enough to keep the ribs and the land projection out of contact and thereby protect the molding surfaces from damage.

DESCRIPTION OF THE PREFERRED EMBODIMENT

Figure 1:
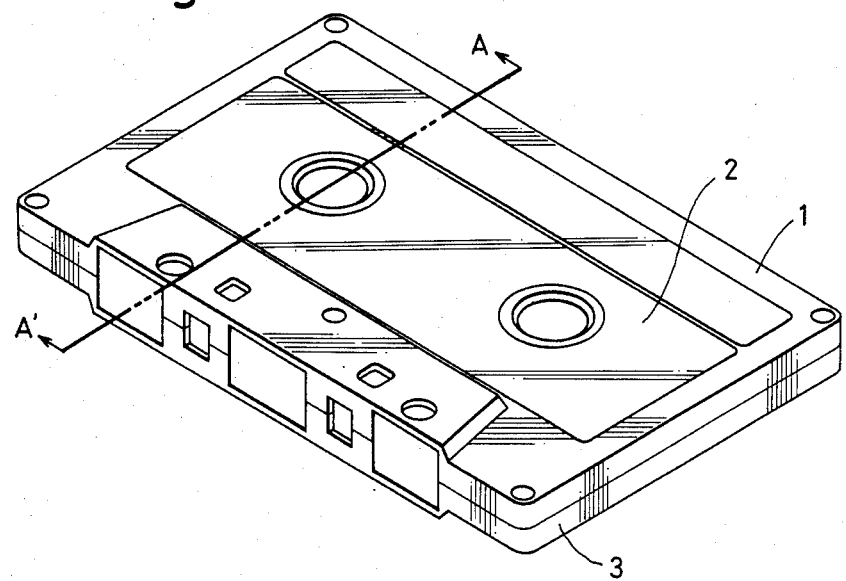
FIG. 1 is a perspective view of an audio cassette as assembled.
Figure 2:
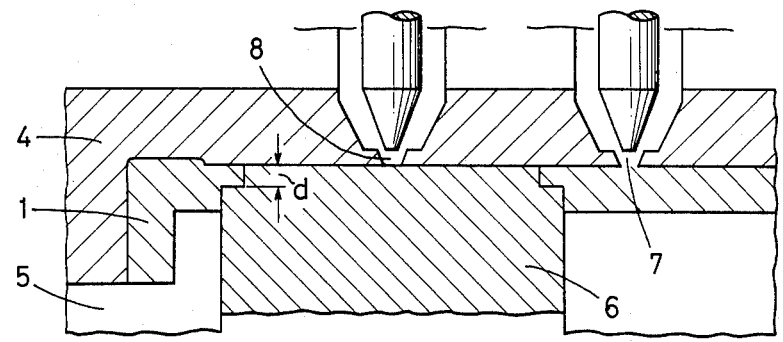
FIGS. 2 and 3 are cross sectional views of a conventional mold arrangement, respectively, for primary injection (to make an upper housing section) and for secondary injection (to form a see-through window)
Figure 3:
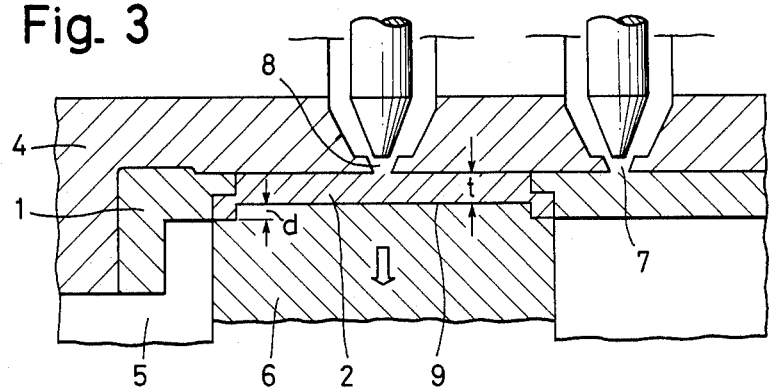
Figure 4:
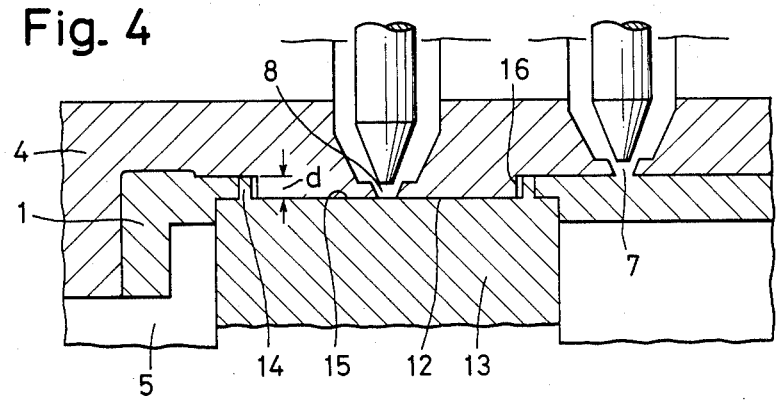
FIGS. 4 and 5 are cross sectional views of a mold arrangement embodying the present invention, respectively, for primary and secondary injection shots.
Figure 5:
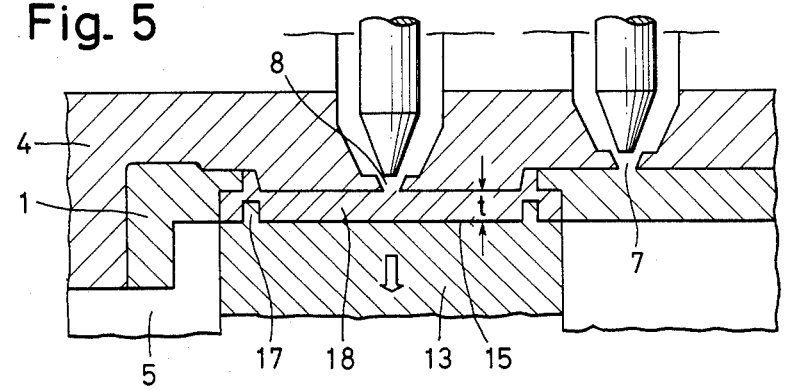

A preferred embodiment of the present invention is shown in FIGS. 4 and 5, which are cross sectional views of a mold similar in basic construction to the prior art mold in FIGS. 2 and 3. FIG. 4 is a sectional view of the mold arrangement at the time of primary injection for forming an upper housing section and FIG. 5 a sectional view of the arrangement during secondary injection for forming a see-through window.

In the both figures, 4 is a fixed half and 5 a movable half of the mold, 13 is a slide core, 7 is a primary injection gate for a shot of colored resin, and 8 is a secondary injection gate for a shot of transparent resin. The portions of the see-through window of transparent resin joined to the upper housing section of colored resin have steps of the height d like those of the prior art already described. A difference is that the slide core 13 has ribs 14 formed in accordance with the invention to the same height as the steps on the upper surface, close to all four sides thereof. These ribs 14 are adapted to come into contact with the molding surface of the fixed mold half 4. The fixed half, in turn, has a downward land projection 12 adapted to mate with the bottom 15 of the recess defined by the ribs 14 of the slide core 13. The inner peripheral walls of the ribs 14 of the slide core 13 and the peripheral walls of the projection from the fixed mold half are not in contact but are spaced apart as at 16. The construction so far described protects the mold from bieng scratched during the clamping for each shot, because the ribs 14 of the slide core 13 and the peripheral walls of the land projection 12 of the fixed mold half are kept out of sliding contact. Consequently, the see-through window for which flawless transparency is essential remains unscratched and the mold life is extended. FIG. 5, a cross sectional view of the mold arrangement during secondary injection, shows the slide core 13 lowered in the direction of the arrow and a see-through window 18 formed by a shot of transparent resin through the gate 8. The see-through window 18 is not recessed on the entire inner side as the conventional window is, but has grooves 17 instead. Hence it causes no unsmooth tape running. Moreover, the outer side of the window 18, not flush with the outer surface of the upper housing section but is recessed with respect to the latter, has fewer chances of being scratched or otherwise damaged while the cassette tape is handled.

As described hereinabove, the present invention makes possible the manufacture of a cassette housing whose see-through window does not have a large recess and therefore causes no such unsmooth running of the tape as referred to above. In addition, the recessed upper surface minimizes the possibility of the see-through window being damaged. Further, the fixed mold half and the ribs of the slide core, which do not come in sliding contact, are protected against damage. These features combinedly prolong the mold life.

What is claimed is:

1. In a mold for stepwise molding including a fixed mold half which has a molding surface forming a part of a first cavity, a movable mold half, and a slide core, the slide core having a surface adapted to fit in intimate contact with the molding surface of the fixed half and embraces a gate orifice for use in secondary injection and also having peripheral surface portions which combine with the molding surfaces of the fixed and movable mold halves to define the first cavity, said slide core being arranged to be removable into and out of contact with said fixed mold half, in such manner that, at the time of primary injection, the surface of said slide core is in intimate contact with the inner surface of said fixed half including the secondary-injection gate orifice to form the first cavity and, at the time of secondary injection, said slide core moves away from the surface of aid fixed half to form a second cavity in between, the improvement comprising: riblike elevations formed on said slide core along the peripheries to define the first cavity and come in intimate contact at their tops with said fixed mold half, and a land projection formed on the inner side of said fixed mold half to be in contact with the surface of said slide core recess between said riblike elevations during the primary injection and forming part of the second cavity during the secondary injection, and the riblike elevations adapted to form grooves during the secondary injection.

2. A mold according to claim 1 wherein the inner peripheral wall faces of said ribs on said slide core at the peripheral wall faces of said land projection of said fixed mold half are adapted to mate spaced apart to remain out of contact at the time of mold clamping during primary injection.

* * * * *